US011719352B2

(12) United States Patent
Doughty (10) Patent No.: US 11,719,352 B2
(45) Date of Patent: Aug. 8, 2023

(54) CHECK COVER ASSEMBLIES FOR BACKFLOW PREVENTION ASSEMBLIES WITH INTEGRATED TEST COCK PROTECTION SHROUD

(71) Applicant: Watts Regulator Co., North Andover, MA (US)

(72) Inventor: Jason Doughty, Fitchburg, MA (US)

(73) Assignee: Watts Regulator Co., North Andover, MA (US)

( * ) Notice: Subject to any disclaimer, the term of this patent is extended or adjusted under 35 U.S.C. 154(b) by 0 days.

(21) Appl. No.: 17/400,686

(22) Filed: Aug. 12, 2021

(65) Prior Publication Data

US 2022/0049786 A1  Feb. 17, 2022

Related U.S. Application Data

(60) Provisional application No. 63/066,411, filed on Aug. 17, 2020.

(51) Int. Cl.
*F16K 15/06* (2006.01)
*E03F 7/04* (2006.01)
(Continued)

(52) U.S. Cl.
CPC ........... *F16K 15/066* (2013.01); *E03B 7/077* (2013.01); *E03C 1/106* (2013.01); *E03F 7/04* (2013.01);
(Continued)

(58) Field of Classification Search
CPC .. E03B 7/077; E03C 1/106; E03F 7/04; F16K 15/033; F16K 15/035; F16K 15/066;
(Continued)

(56) References Cited

U.S. PATENT DOCUMENTS 213,394 A   3/1879  Cornwal
2,310,586 A   2/1943  Lohman
(Continued)

FOREIGN PATENT DOCUMENTS

CN   110081212 A   8/2019
DE   1925477 U   12/1970
(Continued)

OTHER PUBLICATIONS

Lead Free Master Series LF870V product specifications pages, ES-F-LF-870V 1826, 2018, 4 pages.
(Continued)

*Primary Examiner* — Kevin F Murphy
*Assistant Examiner* — Jonathan J Waddy
(74) *Attorney, Agent, or Firm* — Day Pitney LLP; Anthony A. Kassas; Emily Ferriter Russo (57) ABSTRACT

A check cover assembly for a backflow prevention (BFP) assembly including a dome-shaped base with an upstanding shroud, wherein the shroud forms an inner area configured to receive a test cock to support and protect the test cock. The shroud forms a gap for accessing the test cock to selectively open and close the test cock while installed in the inner area. The base forms a passageway from the inner area into the BFP assembly configured so that when the test cock is open, a pressure reading of a pressure zone in the BFP assembly can be taken via the test cock. A retention fork is in a slit formed in the shroud so that the test cock is captured in the inner area but the test cock can be removed from and inserted into the inner area without rotation when the retention fork is removed from the slit.

18 Claims, 8 Drawing Sheets

(51) Int. Cl.
*F16K 27/02* (2006.01)
*E03C 1/10* (2006.01)
*F16K 27/12* (2006.01)
*E03B 7/07* (2006.01)
*F16K 37/00* (2006.01)
*F16K 15/03* (2006.01)
*F16K 17/30* (2006.01)

(52) U.S. Cl.
CPC ........ *F16K 15/035* (2013.01); *F16K 27/0209* (2013.01); *F16K 27/12* (2013.01); *F16K 17/30* (2013.01); *F16K 37/0091* (2013.01)

(58) Field of Classification Search
CPC .. F16K 17/30; F16K 27/0209; F16K 27/0232; F16K 27/12; F16K 35/00; F16K 37/005; F16K 37/0091; F16K 2200/50; F16K 2200/501; F16K 2200/502; F16L 37/373; F16L 37/47; F17C 2205/0308
USPC ............... 137/454.2, 454.4, 454.5, 454.6
See application file for complete search history.

(56) References Cited

U.S. PATENT DOCUMENTS

| | | | |
|---|---|---|---|
| 2,514,374 A | 7/1950 | Cooper | |
| 2,827,921 A | 3/1958 | Sherman et al. | |
| 3,173,439 A | 3/1965 | Griswold et al. | |
| 3,189,037 A | 6/1965 | Modesto | |
| 3,429,291 A | 2/1969 | Hoffman | |
| 3,570,537 A * | 3/1971 | Kelly | F16K 11/0856 |
| | | | 137/454.2 |
| 3,837,357 A | 9/1974 | Slaughter | |
| 3,837,358 A | 9/1974 | Zieg et al. | |
| 3,859,619 A | 1/1975 | Ishihara et al. | |
| 3,896,850 A | 7/1975 | Waltrip | |
| 3,905,382 A | 9/1975 | Waterston | |
| 3,906,987 A | 9/1975 | Rushforth et al. | |
| 3,996,962 A | 12/1976 | Sutherland | |
| 4,014,284 A | 3/1977 | Read | |
| 4,244,392 A | 1/1981 | Griswold | |
| 4,284,097 A | 8/1981 | Becker et al. | |
| 4,416,211 A | 11/1983 | Hoffman | |
| 4,453,561 A | 6/1984 | Sands | |
| 4,489,746 A | 12/1984 | Daghe et al. | |
| 4,523,476 A | 6/1985 | Larner | |
| 4,618,824 A | 10/1986 | Magee et al. | |
| 4,667,697 A | 5/1987 | Crawford | |
| 4,694,859 A | 9/1987 | Smith | |
| 4,776,365 A | 10/1988 | Bathrick et al. | |
| 4,777,979 A | 10/1988 | Twerdochlib | |
| 4,920,802 A | 5/1990 | McMullin et al. | |
| 4,945,940 A | 8/1990 | Stevens | |
| 5,008,841 A | 4/1991 | McElroy | |
| 5,024,469 A | 6/1991 | Aitken et al. | |
| 5,072,753 A | 12/1991 | Ackroyd | |
| 5,125,429 A | 6/1992 | Ackroyd et al. | |
| 5,236,009 A | 8/1993 | Ackroyd | |
| 5,299,718 A | 4/1994 | Shwery | |
| 5,404,905 A | 4/1995 | Lauria | |
| 5,425,393 A | 6/1995 | Everett | |
| 5,520,367 A | 5/1996 | Stowers | |
| 5,551,473 A | 9/1996 | Lin et al. | |
| 5,566,704 A | 10/1996 | Ackroyd et al. | |
| 5,584,315 A * | 12/1996 | Powell | E03F 7/04 |
| | | | 137/454.2 |
| 5,586,571 A | 12/1996 | Guillermo | |
| 5,669,405 A | 9/1997 | Engelmann | |
| 5,711,341 A * | 1/1998 | Funderburk | F16K 27/0227 |
| | | | 137/527.2 |
| 5,713,240 A | 2/1998 | Engelmann | |
| 5,901,735 A | 5/1999 | Breda | |
| 5,918,623 A | 7/1999 | Hidessen | |
| 5,992,441 A | 11/1999 | Enge et al. | |
| 6,123,095 A | 9/2000 | Kersten et al. | |
| 6,155,291 A * | 12/2000 | Powell | F16K 31/084 |
| | | | 137/512 |
| 6,170,510 B1 | 1/2001 | King et al. | |
| 6,234,180 B1 | 5/2001 | Davis | |
| 6,343,618 B1 | 2/2002 | Britt et al. | |
| 6,349,736 B1 | 2/2002 | Dunmire | |
| 6,374,849 B1 | 4/2002 | Howell | |
| 6,378,550 B1 | 4/2002 | Herndon et al. | |
| 6,443,184 B1 * | 9/2002 | Funderburk | F16K 15/066 |
| | | | 137/535 |
| 6,471,249 B1 | 10/2002 | Lewis | |
| 6,513,543 B1 | 2/2003 | Noll et al. | |
| 6,546,946 B2 * | 4/2003 | Dunmire | E03B 7/078 |
| | | | 137/15.18 |
| 6,581,626 B2 | 6/2003 | Noll et al. | |
| 6,659,126 B2 | 12/2003 | Dunmire et al. | |
| 6,675,110 B2 | 1/2004 | Engelmann | |
| 7,114,418 B1 | 10/2006 | Allen | |
| 7,434,593 B2 | 10/2008 | Noll et al. | |
| 7,506,395 B2 | 3/2009 | Eldridge | |
| 7,934,515 B1 | 5/2011 | Towsley et al. | |
| 8,220,839 B2 | 7/2012 | Hall | |
| 8,997,772 B2 | 4/2015 | Noll et al. | |
| 9,091,360 B2 | 7/2015 | Frahm | |
| 9,539,400 B2 | 1/2017 | Gumaste et al. | |
| 9,546,475 B2 | 1/2017 | Lu | |
| 9,995,605 B2 | 6/2018 | Konno et al. | |
| 10,132,425 B2 | 11/2018 | Di Monte | |
| 10,561,874 B2 | 2/2020 | Williams et al. | |
| 10,719,904 B2 | 7/2020 | Yasumuro et al. | |
| 10,883,893 B2 | 1/2021 | Shaw et al. | |
| 10,914,412 B2 | 2/2021 | Doughty et al. | |
| 10,962,143 B2 | 3/2021 | Cis et al. | |
| 2002/0043282 A1 | 4/2002 | Horne et al. | |
| 2002/0078801 A1 | 6/2002 | Persechino | |
| 2003/0000577 A1 | 1/2003 | Noll et al. | |
| 2003/0168105 A1 | 9/2003 | Funderburk | |
| 2004/0045604 A1 | 3/2004 | Dunmire et al. | |
| 2004/0107993 A1 | 6/2004 | Stephens | |
| 2005/0092364 A1 | 5/2005 | Furuya et al. | |
| 2005/0199291 A1 | 9/2005 | Price et al. | |
| 2006/0076062 A1 * | 4/2006 | Andersson | F16K 15/063 |
| | | | 137/512 |
| 2006/0196542 A1 | 9/2006 | Yen | |
| 2007/0181191 A1 | 8/2007 | Wittig et al. | |
| 2007/0193633 A1 | 8/2007 | Howell et al. | |
| 2007/0204916 A1 | 9/2007 | Clayton et al. | |
| 2007/0204917 A1 * | 9/2007 | Clayton | E03C 1/108 |
| | | | 137/512 |
| 2007/0240765 A1 | 10/2007 | Katzman et al. | |
| 2008/0289567 A1 | 11/2008 | Gordon | |
| 2009/0136935 A1 | 5/2009 | Petersen | |
| 2009/0194719 A1 | 8/2009 | Mulligan | |
| 2011/0067225 A1 * | 3/2011 | Bassaco | F16L 37/34 |
| | | | 285/82 |
| 2011/0309076 A1 * | 12/2011 | Liebenberg | F17C 13/025 |
| | | | 220/203.01 |
| 2012/0248759 A1 | 10/2012 | Feith | |
| 2013/0026743 A1 | 1/2013 | Baca | |
| 2013/0255452 A1 | 10/2013 | Kovach | |
| 2017/0023141 A1 | 1/2017 | Andersson | |
| 2018/0156488 A1 | 6/2018 | Stanley et al. | |
| 2019/0043157 A1 | 2/2019 | Yasumuro et al. | |
| 2019/0136935 A1 | 5/2019 | Hulstein et al. | |
| 2019/0162341 A1 | 5/2019 | Chiproot | |
| 2019/0271428 A1 * | 9/2019 | O'Connor | F16L 47/285 |
| 2019/0323618 A1 | 10/2019 | Fletcher et al. | |
| 2020/0141612 A1 | 5/2020 | Thibodeaux | |
| 2021/0172157 A1 | 6/2021 | Burke et al. | |
| 2021/0230850 A1 | 7/2021 | Bouchard et al. | |

FOREIGN PATENT DOCUMENTS

| | | |
|---|---|---|
| DE | 8525261 U1 | 11/1985 |
| DE | 202014102566 U1 | 8/2014 |
| DE | 202014102568 U1 | 9/2015 |
| EP | 3832183 A1 | 6/2021 |

(56) References Cited

FOREIGN PATENT DOCUMENTS

| JP | 2002213629 A | 7/2002 |
|---|---|---|
| WO | 2003060459 A1 | 7/2003 |
| WO | 2020023584 A1 | 1/2020 |

OTHER PUBLICATIONS

Watt TK-99E Backflow Preventer Test Kit Product Specifications and Test Information, IS-TK99E 0829, 2009, 4 pages.
Watts Water Technologies Company, Installation, Maintenance & Repair Series 909, LF909, 909RPDA, LF909RPDA, 2016, 8 pages.
Watts Water Company, Series 909RPDA for Health Hazard Applications, 2016, 4 pages.
Watts Regulator Co., Watts ACV 113-6RFP Flood Protection Shutdown Valve for Health Hazard Applications, 2020, 4 pages.
European Search Report for European Patent Application No. 20192133.5 dated Feb. 1, 2021, 9 pages.
Ames Fire & Waterworks, division of Watts Industries, F-A-Spools/Flanges, 2001, 4 pages.
Watts, S-RetroFit-Simple, 2017, 2 pages.
*Zurn Industries, LLC* vs. *Conbraco Industries, Inc.*, Complaint for patent infringement, United States District Court for the Center District of California Western Division, Case No._ 2.16-CV-5656, Jul. 29, 2016; 5 pages.
Wilkins Company, Model 375/475MS Series, Installation, Maintenance and Instruction Sheet, 2006, 1 page.
Apollo Valves PVB4A Series Installation, Operation and Maintenance Manual for Model PVB4A ½"-2" Pressure Vacuum Breaker Backflow Preventer, dated Jan. 11, 2012, 12 pages.
Apollo Valves PVB4A Series Installation, Operation, and Maintenance Manual, copyright May 2009, 9 pages.
Watts Water Technologies Company Brochure ES LF800M4QT for Health Hazard Applications Lead Free Series LF8 M4QT Anti-Siphon Vacuum Breakers Sizes ½"-2", copyright 2013, 4 pages.
Conbraco BFMMPVB Maintenance Manual for Series 4V-500 ½"-2" Pressure Type Vacuum Breaker, 04/02, Conbraco Industries, Inc., Matthews, North Carolina 28106, 6 pages.
Watts, "Double Check Valve Assembly Backflow Preventers, Bronze," Article 1, 2021, 6 pages.
Watts, "Reduced Pressure Zone Assembly Backflow Preventers, Bronze Body, Sizes ¼-2 IN," Article 1, 2021, 16 pages.
Miscellaneous Communication issued in European patent application No. 20211811.3, dated Apr. 5, 2021, 8 pages.
Office Action issued in corresponding Chinese patent application No. 20201920527.3, dated Mar. 10, 2021, 1 page (translation unavailable).
International Search Report and Written Opinion issued in corresponding international patent application No. PCT/US2021/046208, dated Dec. 1, 2021, 8 pages.
International Search Report and Written Opinion issued in corresponding International Patent Application No. PCT/US2021/062395, dated Feb. 23, 2022, 7 pages.
International Search Report and Written Opinion issued in corresponding International Patent Application No. PCT/US2021/046101, dated Nov. 22, 2021, 8 pages.
European Search Report received for European Patent Application No. 20211811.3, dated May 4, 2021, 2 pages.

\* cited by examiner

CHECK COVER ASSEMBLIES FOR BACKFLOW PREVENTION ASSEMBLIES WITH INTEGRATED TEST COCK PROTECTION SHROUD

CROSS-REFERENCE

This application claims priority to U.S. Provisional Patent Application No. 63/066,411, filed Aug. 17, 2020, which is incorporated herein by reference.

FIELD OF THE DISCLOSURE

The subject disclosure relates to backflow prevention assemblies, and more particularly to backflow prevention assemblies having test cocks that are integrated and/or protected by a shroud.

BACKGROUND

In many water systems, backflow prevention (BFP) assemblies allow fluid and even solids to flow only in a desired, i.e., a forward, direction. As backsiphonage or backflow can present contamination and health problems, the backflow prevention valves and assemblies prevent flow in an undesired direction, i.e., a backward or reverse direction. BFP assemblies are installed in buildings, such as residential homes, and commercial buildings and factories, to protect public water supplies by preventing the reverse flow of water from the buildings back into the public water supply.

Owing to the fact that BFP assemblies are important for water safety, BFP units are tested annually, often per government regulations, to assure proper operating conditions. Specifically, fluid pressure measurements are taken at specified locations in the BFP unit. If it is determined that a check valve, test cock or other component needs to be repaired or replaced, the inlet and outlet shutoff valves have to be closed, the faulty part analyzed and replaced. Then, the BFP assembly can be retested, the shutoff valves opened and the apparatus confirmed to be operating per any required ordinances and/or standards. The process is time-consuming and the steps have to be performed in the correct sequence and manner in order to not contaminate the public water supply, inadvertently flood an area, and return the BFP assembly to working order. In order to save testing time, BFP assemblies typically have one or more test cocks, which may couple to a test fixture.

SUMMARY

The test cocks of BFP assemblies usually extend upward for easy access and use. Preferably, a check cover assembly in accordance with the subject technology provides support and/or protection. The check cover assembly may reinforce and/or shield the test cock. In many embodiments, the test cock can easily be installed or removed from the check cover for quick repair and replacement.

The subject technology is directed to a check cover assembly for a backflow prevention (BFP) assembly including a base with an upstanding shroud. The shroud forms an inner area configured to receive a test cock to support and protect the test cock. Preferably, the base is dome-shaped and fabricated of a composite polymer. The shroud can form a gap for accessing the test cock to selectively open and close the test cock while installed in the inner area. The base may form a passageway from the inner area into the BFP assembly configured so that when the test cock is open, a pressure reading of a pressure zone in the BFP assembly can be taken via the test cock. In one embodiment, a banking surface in the inner area compliments a banking surface of the test cock to further stabilize the test cock.

The check cover assembly can also include a retention fork in a slit formed in the shroud so that the test cock is captured in the inner area but the test cock can be removed from and inserted into the inner area without rotation when the retention fork is removed from the slit. The retention fork has two flat tines with a gap there between, the gap and the tines being sized to snugly fit into a groove of the test cock. Preferably, the base forms a hollow to create a socket portion of a ball-and-socket joint formed between the check cover assembly and a check valve assembly in the BFP assembly. In another embodiment, the base forms a passageway from the inner area that aligns with a lumen formed in a check valve assembly in the BFP assembly, the lumen being in fluid communication with a pressure zone within the BFP assembly so that when the test cock is open, a pressure reading of the pressure zone can be taken via the test cock.

The check cover assembly can further include a second upstanding shroud on the base, wherein the second shroud forms an inner area configured to receive a second test cock to support and protect the test cock while allowing opening of the second test cock in place to allow pressure testing of a zone upstream from a check valve assembly coupled to the check cover. The test cock may be a ball valve and integrated into the shroud so that the shroud forms at least a portion of a housing surrounding a ball of the test cock.

The subject technology is also directed to a protective assembly for a test cock on a valve assembly including an upstanding shroud. The shroud forms an inner area configured to receive a test cock to support and protect the test cock. The shroud may also form a gap for accessing the test cock to selectively open and close the test cock while installed in the inner area. The shroud forms a slit for a retention fork so that the test cock is selectively captured in the inner area but the test cock can be removed from and inserted into the inner area without rotation when the retention fork is removed from the slit.

Another embodiment of the subject technology is directed to a BFP assembly comprising a check cover including a base with an upstanding shroud. The shroud forms an inner area configured to receive a test cock to support and protect the test cock. The shroud forms a void for accessing the test cock to selectively open the test cock while installed in the inner area for pressure testing a first zone in the BFP assembly. The BFP assembly may also include a second upstanding shroud on the base, wherein the second shroud forms an inner area configured to receive a second test cock to support and protect the second test cock while allowing selectively opening of the second test cock in place to allow pressure testing of a second zone in the BFP assembly. Each test cock is preferably a ball valve and integrated into the respective shroud so that the respective shroud forms at least a portion of a housing surrounding a ball of the test cock.

BRIEF DESCRIPTION OF THE DRAWINGS

Various aspects of the present disclosure are discussed herein with reference to the accompanying Figures. It will be appreciated that for simplicity and clarity of illustration, elements shown in the drawings have not necessarily been drawn accurately or to scale. For example, the dimensions of some of the elements can be exaggerated relative to other elements for clarity or several physical components can be included in one functional block or element. Further, where considered appropriate, reference numerals can be repeated among the drawings to indicate corresponding or analogous elements. For purposes of clarity, however, not every component can be labeled in every drawing. The Figures are provided for the purposes of illustration and explanation and are not intended as a definition of the limits of the disclosure.

DETAILED DESCRIPTION

The subject technology overcomes many of the prior art problems associated with backflow prevention assemblies. The advantages, and other features of the technology disclosed herein, will become more readily apparent to those having ordinary skill in the art from the following detailed description of certain exemplary embodiments taken in combination with the drawings and wherein like reference numerals identify similar structural elements. It should be noted that directional indications such as vertical, horizontal, upward, downward, right, left and the like, are used with respect to the figures and not meant in a limiting manner.

Figure 1:
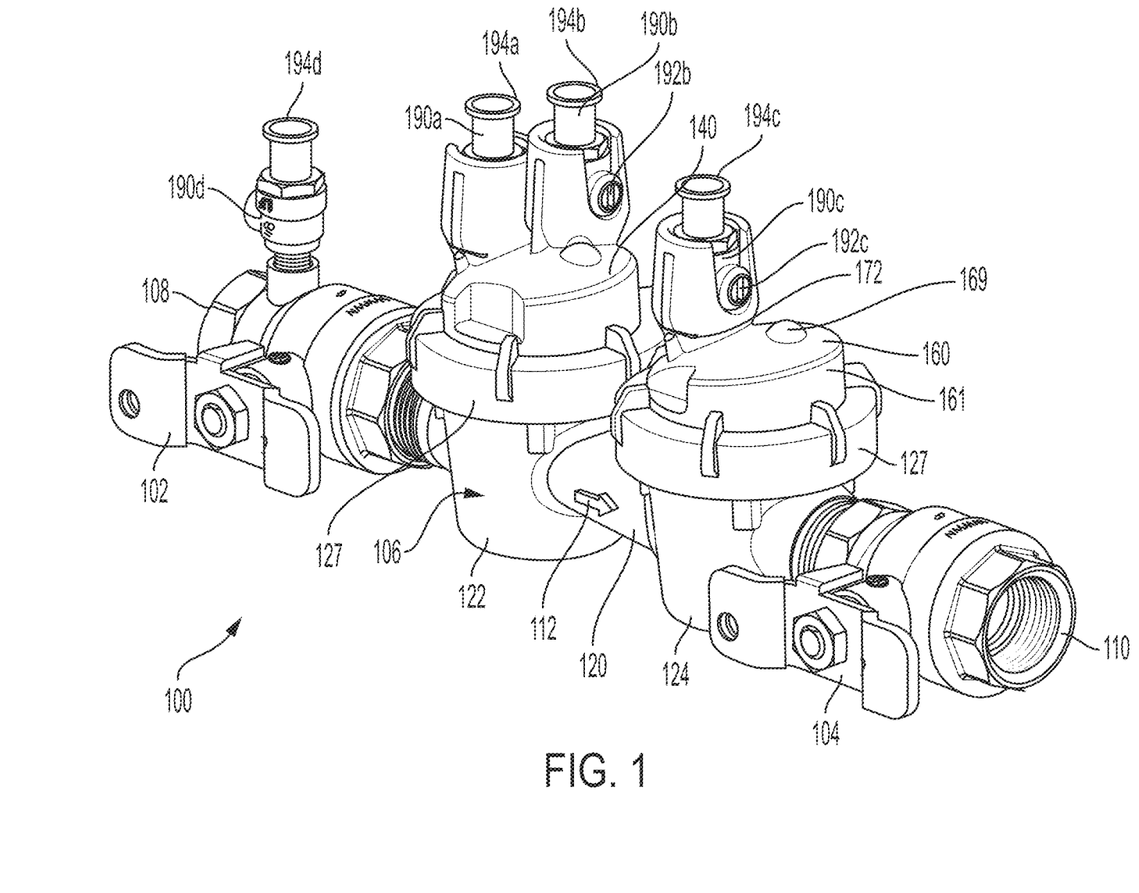
FIG. 1 is a perspective view of a backflow prevention BFP assembly with a check cover assembly having a protective shroud for each test cock in accordance with the present disclosure.
Figure 2:
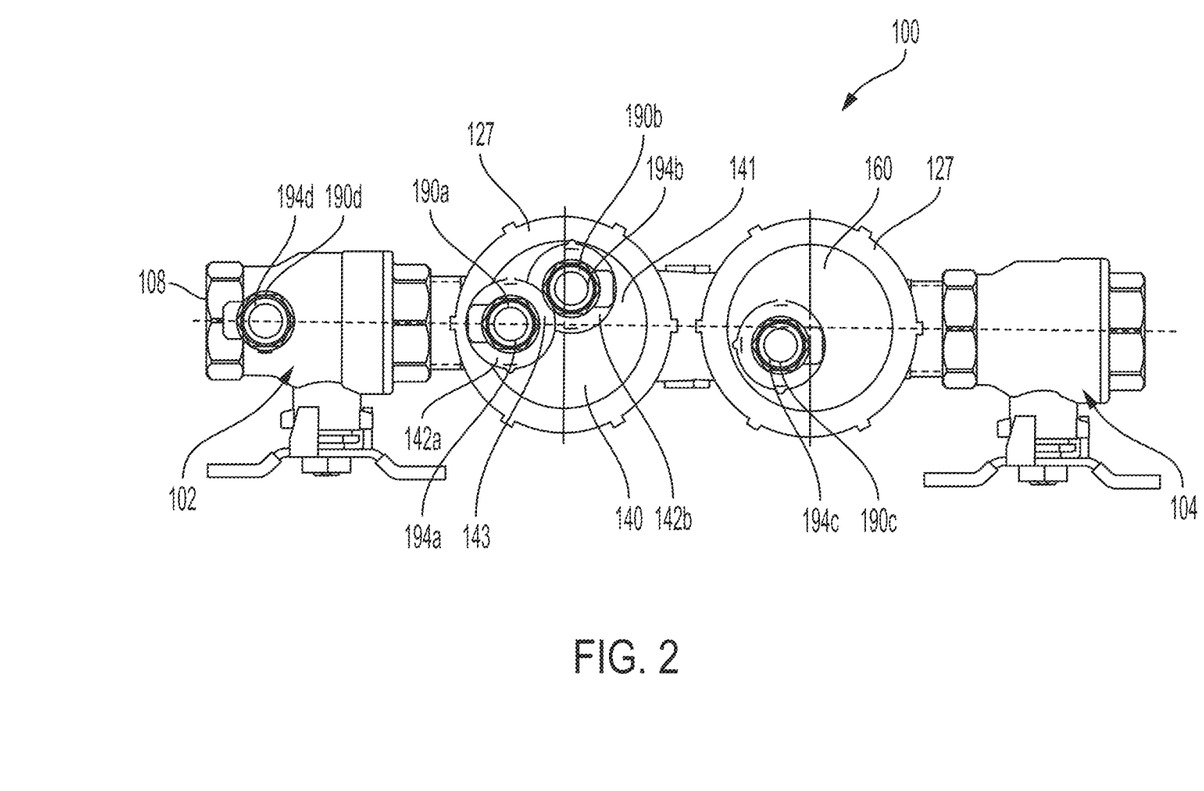
FIG. 2 is a top view of the BFP assembly of FIG. 1.

Referring now to FIGS. 1 and 2, shown are perspective and top views of a backflow prevention (BFP) assembly 100 in accordance with an aspect of the present disclosure. The BFP assembly 100 may be installed in a fluid system, e.g., a water supply for a building. The BFP assembly 100 includes an inlet shutoff valve 102 and an outlet shutoff valve 104. In one embodiment, the shutoff valves 102, 104 are one inch full port ball valves. A backflow prevention valve assembly 100 extends between the shutoff valves 102, 104. Many different configurations of BFP assemblies are possible.

In normal operation, the BFP assembly 100 operates to carry fluid in only a forward direction as shown by indicia arrow 112, e.g., left to right in FIG. 2, from an inlet 108 to an outlet 110. The BFP assembly 100 operates to prevent flow in a backward direction, i.e., a direction from right to left in FIG. 2.

The BFP assembly 100 includes a body 120 forming an upstream bucket 122 and a downstream bucket 124. Each bucket 122, 124 is enclosed by a check cover assembly 140, 160. The downstream test cover 140 includes two test cocks 190a, 190b for sensing pressure within the BFP assembly 100. The upstream check cover assembly 160 includes a single test cock 190c but the check cover assemblies 140, 160 are otherwise very similar. Preferably, the check cover assemblies 140, 160 are fabricated from a composite polymer. The inlet shutoff valve 102 also includes a test cock 190d.

Figure 3:
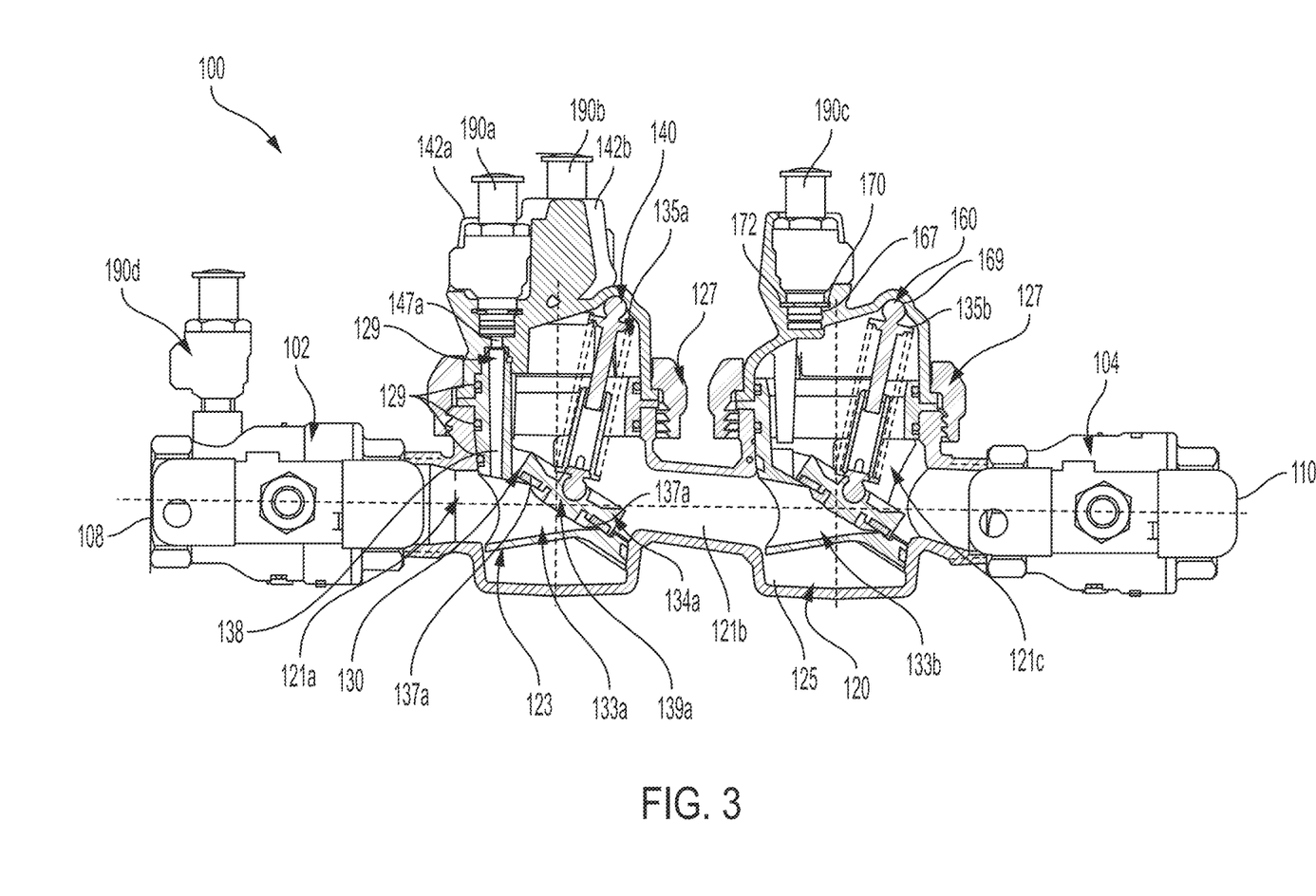
FIG. 3 is a cross-sectional view of the BFP assembly of FIG. 1.

Referring now to FIG. 3, a cross-sectional view of the BFP assembly 100 is shown. Each bucket 122, 124 defines an interior 123, 125 for containing a check valve assembly 130a, 130b. The check valve assemblies 130a, 130b are preassembled and inserted into the interiors 123, 125. Each check valve assembly 130a, 130b includes a frame 132a, 132b with a lower check seat 133a, 133b, which is selectively closed by a hinged disc holder assembly 134a, 134b. A spring bias assembly 135a, 135b urges the disc holder assembly 134a, 134b into the closed position. In the closed position, a sealing disc 137a, 137b carried by the disc holder 134a, 134b closes a valve opening 139a, 139b formed by the check seat 133a, 133b.

If the pressure upstream of the check valve assemblies 130a, 130b exceeds the force of the spring bias assemblies 135a, 135b, the check valve assemblies 130a, 130b will open to allow forward flow. If not, one or both of the spring bias assemblies 135a, 135b will keep the BFP assembly 100 closed. The check valve assemblies 130a, 130b form three zones 121a-c within the BFP assembly 100. The upstream zone 121a extends to the valve opening 139a. The intermediate zone 121b extends between the valve openings 139a, 139b. The downstream zone 121c extends from the valve opening 139b.

The spring retainer assemblies 135a, 135b extend against the respective check cover assembly 140, 160. The check cover assemblies 140, 160 form hollows 149, 169 to create a somewhat ball-and-socket joint to allow rotational movement of the spring bias assemblies 135a, 135b. The check cover assemblies 140, 160 enclose the interiors 123, 125 and are secured in place by a cover nut 127. O-rings 129 insure a proper seal.

Figure 4A:
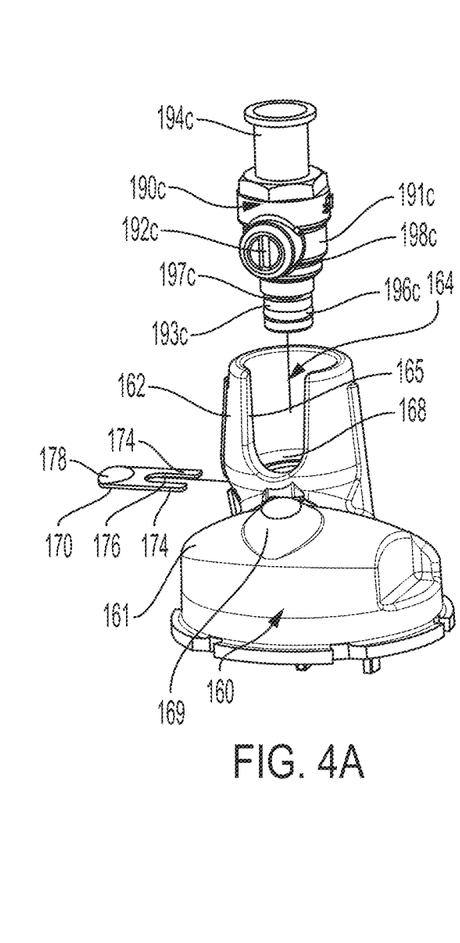
FIG. 4A is an exploded perspective view of a check cover assembly in accordance with the present disclosure.
Figure 4B:
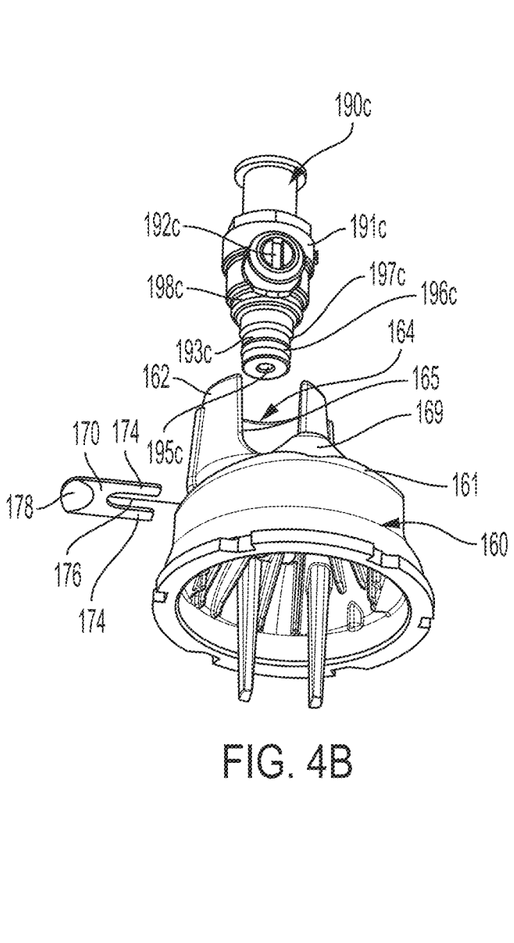
FIG. 4B is another exploded perspective view of the check cover assembly of FIG. 4A.

Referring additionally to FIGS. 4A and 4B, exploded perspective views of the check cover assembly 160 are shown. The check cover assembly 160 is a dome-shaped base 161 with an upstanding cup-shaped shroud 162. The shroud 162 forms a protected inner area 164 that receives the test cock 190c. Similarly, the check cover assembly 140 also has a dome-shaped base 161. The base 161 and the shroud 162 may be unitarily formed. In another embodiment, the shroud 162 is formed separately and attached, such as by threads, to the base 161. The shroud 162 forms a U-shaped peripheral gap 165. It is envisioned that the gap 165 may be any size or shape void (e.g., a hole, a slot and the like) that allows access to the test cock 190c and/or easy removal.

The test cock 190c is preferably an elongated ball valve with a slot 192c for actuating the test cock 190c between the open position (shown) and the closed position. The shroud 162 and gap 165 are sized and configured so that the slot 192c is flush to avoid inadvertent actuation or damage of the test cock 190c. The test cock 190c has a central housing body 191c connected to an upper coupling 194c that receives a fixture to take a pressure reading of the downstream zone 121c. In another embodiment, the shroud 162 extends up to or even past the upper coupling 194 and may flare out to facilitate coupling to a test fixture. A lower coupling 193c couples to the check cover assembly 160 as described in more detail below. A passage 195c extends through the test cock 190c. To close the test cock 190c (e.g., block the passage 195c), a flat screwdriver can be inserted into the slot 192c to rotate the slot 192c approximately ninety degrees (e.g., a horizontal position). The lower coupling 193c carries an o-ring 196c to seal against the check cover assembly 160.

The shroud 162 also forms a gap 165 for accessing the test cock slot 192c when installed. The test cock 190c fits snugly in the inner area 164 so the shroud 162 provides support and protection. The check cover assembly 160 forms a passageway 167 from the inner area 164 to the downstream zone 121c. Thus, when the test cock lower coupling 193c is inserted into the check cover passageway 167 and the test cock 190c is open, a pressure reading of the downstream zone 121c can be taken. The test cock o-ring 196c seals in the passageway 167. A banking surface 168 in the inner area 164 compliments a banking surface 198c of the test cock 190c to further stabilize the test cock 190c.

In addition to the above, a retention fork 170 inserts through a slit 172 (best seen in FIG. 1) in the check cover assembly 160 to capture the test cock 190c in the inner area 164. The fork 170 has two flat tines 174 with a gap 176 between the tines 174. The gap 176 and tines 174 are sized to snugly fit into the test cock groove 197c. Thus, the test cock 190c can be inserted into the inner area 164 and, without rotation, the fork 170 is inserted into the slit 172 to capture the test cock 190c in place. The fork 170 has a hand grip end 178 that extends out of the slit 172 for easy manual removal of the test cock 190c when desired. In another embodiment, a set screw, a permanent clip, cotter pin or the like is used to retain the test cock in place. In one embodiment, once the test cock is installed, the locking feature is permanent so that tampering is prevented among other benefits.

Referring again to FIGS. 1-3, there are two shrouds 142a, 142b on the check cover assembly 140. As shown, the shrouds 142a, 142b share a partial sidewall 143 but could also be completely separate. Although not distinctly shown, each shroud 142a, 142b has similar basic structure and function to the shroud 160 discussed above. The shroud 142b is very similar in that the shroud 142b protects and supports the test cock 190b utilized to test the pressure after the respective check valve assembly 130 in the intermediate zone 121b. However, for the test cock 190a to access the upstream zone 121a, the check valve assembly 130a forms a vertical lumen 138 aligned with the passage 147a.

As can be seen, the shrouds 142a. 142b, 162 support and protect the respective test cocks 190a-c, yet by simply inserting or removing the fork 170, the test cocks 190a-c can be quickly and easily fixed in place or removed without rotational movement thereof. Further, the shrouds 142a, 142b, 162 provide ample access to open and close the test cocks 190a-c while in place. In another embodiment, the ball valve includes a shroud and fork as discussed herein to support and protect the test cock. In another embodiment, the shroud has slots to reduce the material required for fabrication. In still another embodiment, the test cock is a smart test cock that may include sensors, wireless transmission electronics and the like, wherein the shroud is configured to provide protected space for the smart test cock.

Figure 5:
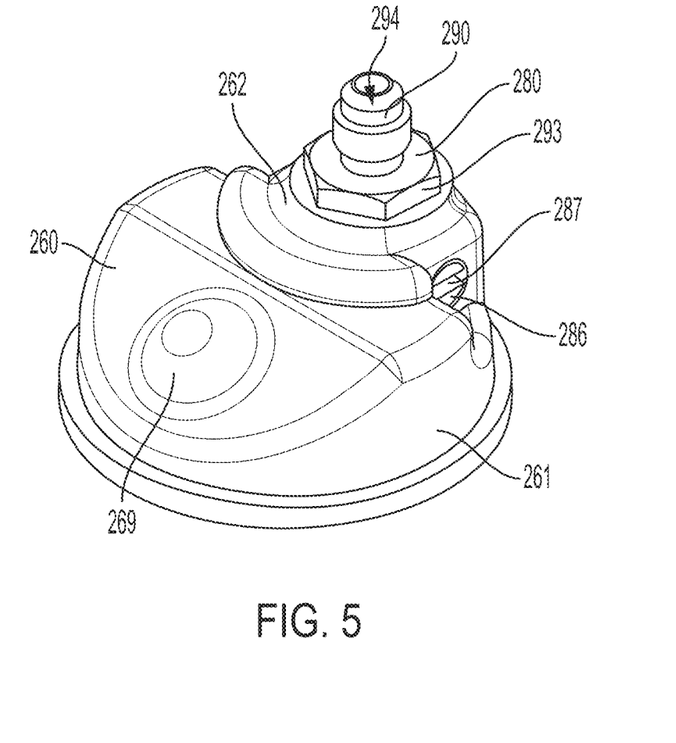
FIG. 5 is a perspective view of another check cover assembly with an integral test cock in accordance with the present disclosure.

Referring now to FIG. 5, a perspective view of another check cover assembly 260 is shown. As will be appreciated by those of ordinary skill in the pertinent art, the check cover assembly 260 utilizes similar principles to the check cover assembly 160 described above. Accordingly, like reference numerals in the "200" series are used to indicate like elements. The primary difference of the check cover assembly 260 is that a test cock 280 is integral with the base 261 and shroud 262, which reduces the number of components.

Figure 6:
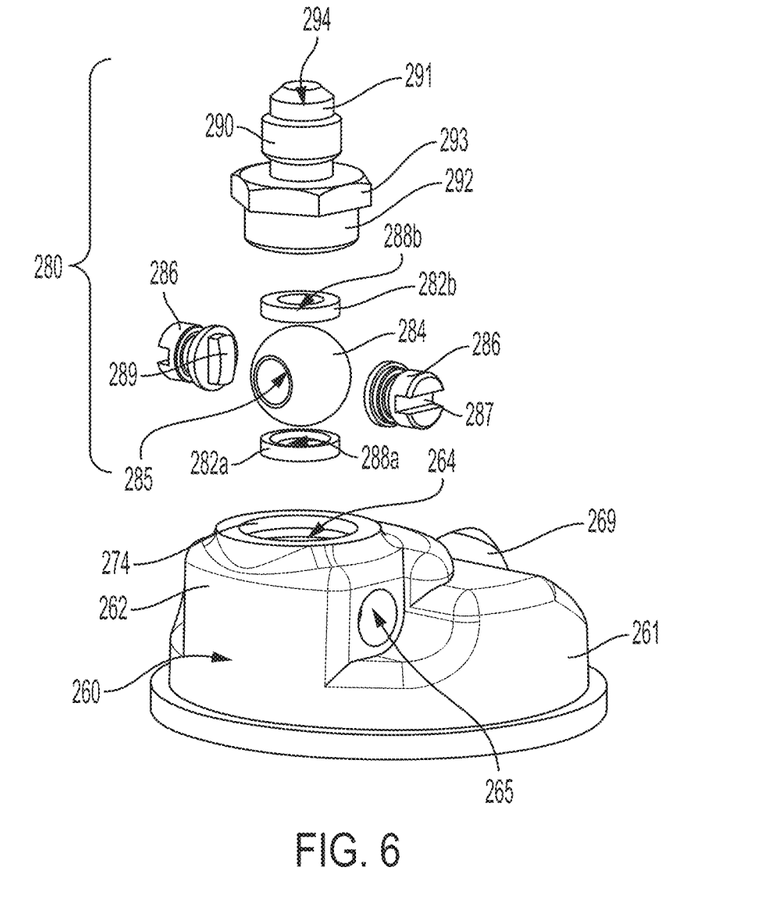
FIG. 6 is an exploded view of the check cover assembly of FIG. 5.

Referring now to FIG. 6, an exploded view of the check cover assembly 260 is shown. The base 261 and shroud 262 still form an inner protected area 264 but the protected area 264 serves to form the housing body for the test cock 280.

The test cock 280 has a lower seal piece 282a and an upper seal piece 282b that sandwich a ball 284. The seal pieces 282a, 282b may carry o-rings (not distinctly shown) and the like for creating a seal against the ball 284, base 261 and shroud 262. Each seal piece 282a, 282b has a central aperture 288a, 288b that supports the ball 284 for rotational movement.

The ball 284 has a central aperture 285 through which fluid may flow when oriented in the open position. Stems 286 are inserted into access gaps 265 of the shroud 262 to couple to the ball 284 for rotating the ball 284 between the open and closed positions. A distal end 289 of the stem forms a landkey to engage a complimentary groove (not shown) in the outer circumference of the ball 284. Slots 287 in the stems 286 make it easy to use a screwdriver to adjust the test cock 280 between open and closed.

A coupling 290 fixes the ball 284 and pieces 282a, 282b in the protected area 264. The coupling 290 has an upper end 291 configured to engage a test fixture (not shown). A lower end 292 of the coupling is threaded to engage inner threads 274 of the shroud 262. A middle portion 293 is hexagonal shaped to allow tightening the coupling 290 into the base 261 with a wrench (not shown). The coupling 290 forms a passage 294 sized and oriented to align with the ball's central aperture 285 in the open position.

Figure 7:
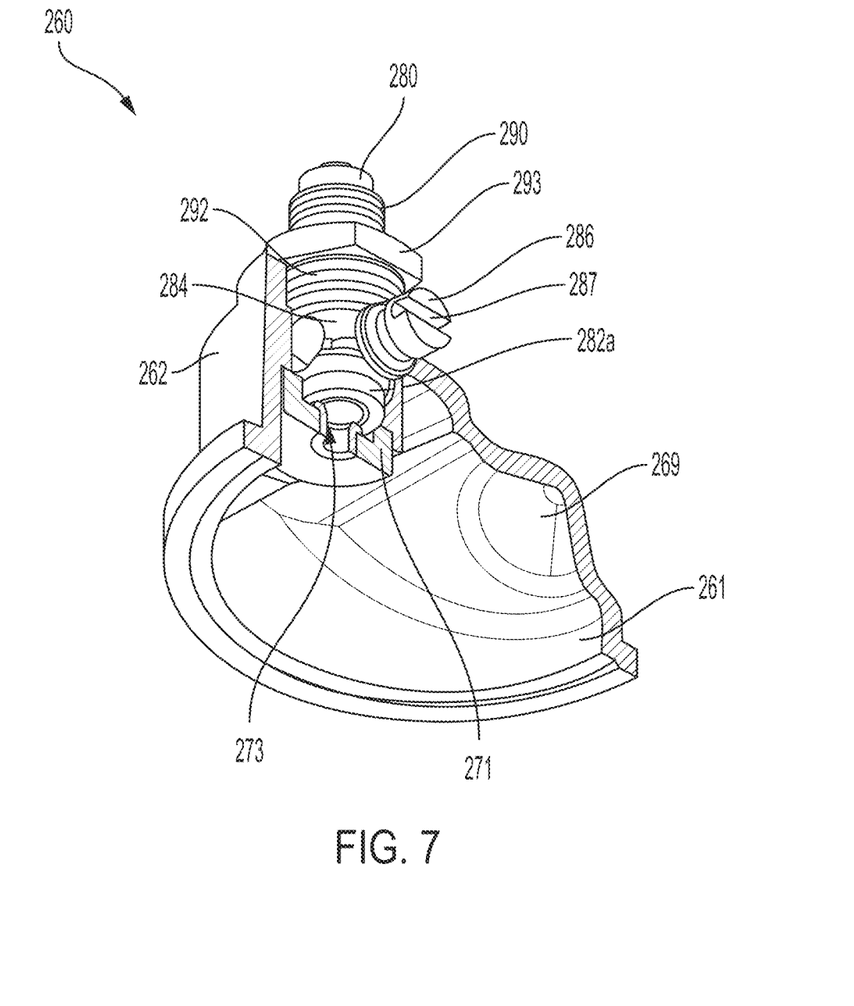
FIG. 7 is a cross-sectional view of the check cover assembly of FIG. 5.

Referring now to FIG. 7, a cross-sectional view of the check cover assembly 260 is shown. The shroud 262 has a bottom inner shoulder 271 that forms a central passage 273. When assembled, the ball 284 and pieces 282a, 282b are compressed between the shoulder 271 and coupling 290. In the open position, the ball 284 is rotated so that the passage 294, central holes 288a, 288b, central aperture 285 and passage 273 are all aligned so that the zone under the check cover assembly 260 may be tested.

Figure 8:
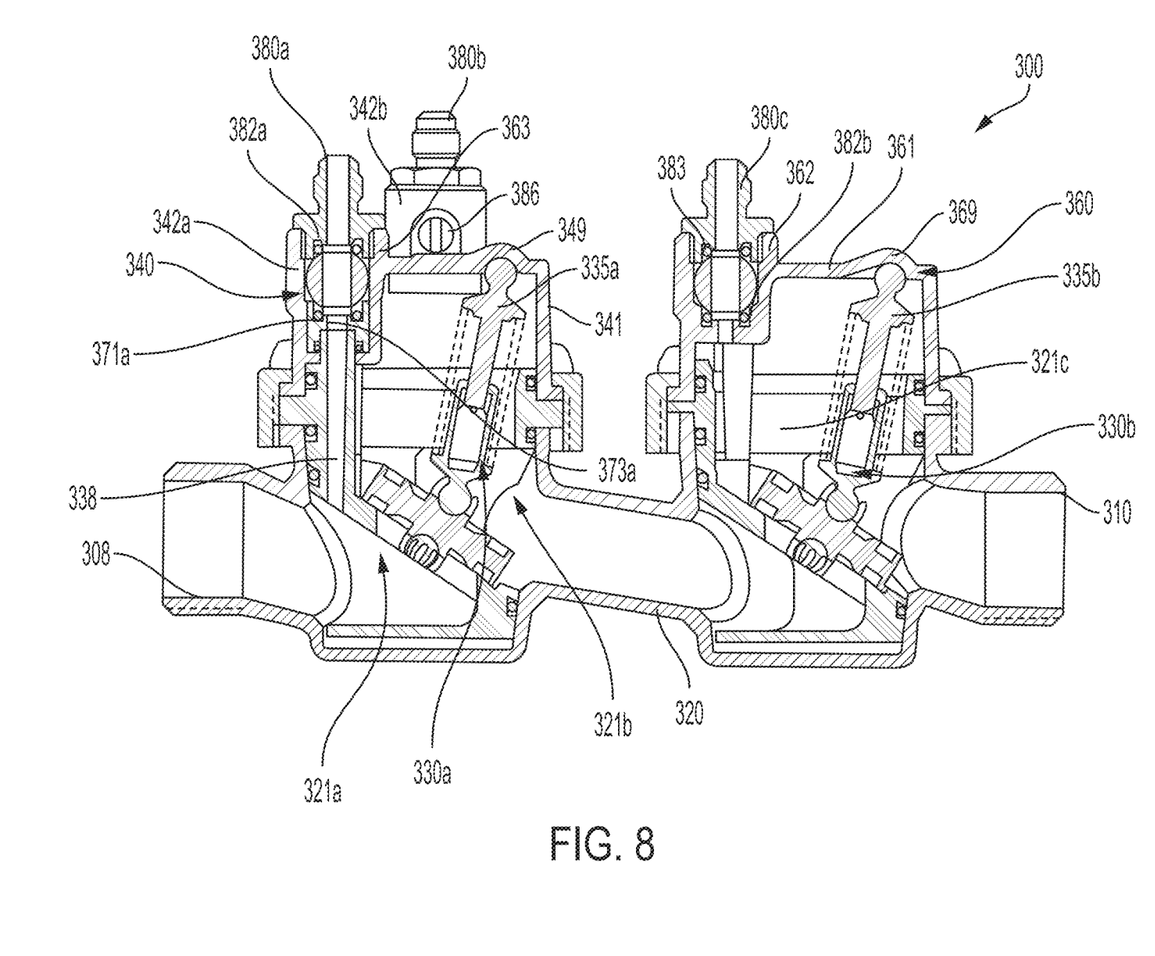
FIG. 8 is a cross-sectional view of a backflow prevention assembly with check cover assemblies having integral test cocks in accordance with the present disclosure.

Referring now to FIG. 8, a cross-sectional view of a BFP assembly 300 with check cover assemblies 340, 360 having integral test cocks 380a-c in accordance with the present disclosure are shown. The BFP assembly 300 is similar to that shown above so that similar components are labeled in the 300 series when possible and not described again for brevity. Check cover assembly 360 is similar to check cover assembly 260 described above. The test cock 380c of the check cover assembly 360 is shown in the open position so that the downstream zone 321c can be tested. The endpieces 382a, 382b are shown in more detail in that the endpieces 382a. 382b carry two o-rings 383. Each base 341, 361 forms a hollow 349, 369 to create a socket portion of a ball-and-socket joint formed between the check cover assembly 340,360 and a spring bias assembly 335a, 335b of check valve assemblies 330a, 330b in the BFP assembly 100.

As can be seen, two test cocks 380a, 380b are integrated into the check cover assembly 340. Thus, the upstream zone 321a and the intermediate zone 321b can both be checked. Similar to BFP assembly 100, the shrouds 342a, 342b share a common sidewall 363 but still form the housing for the test cocks 380a, 380b, respectively. The central passage 373a of the shoulder 371a of the shroud 342a aligns with the lumen 338 for testing the upstream zone 321a. By having the test cocks 380a-c integrated in the cover assemblies 340, 360, fast and easy repairs can be accomplished by simply swapping in a new test cover assembly 340, 360. The test cock 380c is similar integrated into the check cover assembly 360.

It is also envisioned that a variety of different components or features may be incorporated into the test cover assemblies shown herein. For example, instead of or in addition to test cocks, the test cover assemblies may include a pressure sensor, a pressure switch, a temperature switch, a flow sensor and like combination devices. For example, one pressure and temperature switch is available from Grundfos Holding A/S of Bjerringbro, Denmark as model number 105RPS. Such components may be installed and protected by a shroud or more fully integrated into the test cover assembly for protection as shown herein. The test covers and shrouds can take different shapes to match the component(s) as needed The subject technology provides ample support and protection for test cocks while maintaining full functionality and access to the different zones of a backflow prevention assembly. Being able to simply utilize a retaining feature like a fork (or equivalent embodiment such as a set screw, cotter pin or the like) to retain the test cock in place to quickly remove or replace a test cock without rotation makes for faster and easier repairs. By having test cocks integrated into the check cover assembly, the number of components is advantageously reduced. Further, the test cock components are well supported and protected by integration. If desired, the retaining mechanism may be made in such a manner to be non-end user serviceable, as to comply with local ordinance requirements. In such a situation or for an expedited repair, the check cover assembly can simply be replaced quickly if necessary. As can be seen, the subject disclosure provides many improvements to BFP assemblies. Further, the subject technology can be adapted to any kind of valve.

It will be appreciated by those of ordinary skill in the pertinent art that the functions of several elements can, in alternative embodiments, be carried out by fewer elements, or a single element. Similarly, in some embodiments, any functional element can perform fewer, or different, operations than those described with respect to the illustrated embodiment. Also, functional elements (e.g., check valves, valve elements, o-rings, thread, spring retention assemblies, and the like) shown as distinct for purposes of illustration can be incorporated within other functional elements in a particular implementation.

While the subject technology has been described with respect to various embodiments, those skilled in the art will readily appreciate that various changes and/or modifications can be made to the subject technology without departing from the scope of the present disclosure.

What is claimed is:

1. A valve assembly for a backflow prevention device having a body defining an interior, the valve assembly comprising:
   a test cock releasably connected to the body for easy repair and replacement, the test cock being in fluid communication with the interior and having a ball valve housing; and
   an upstanding shroud coupled to the body, wherein: the shroud forms an inner area configured to surround the test cock when connected to the body to support and protect the test cock; the shroud forms a first void for accessing an actuation feature of the test cock to selectively open and close the test cock while installed in the inner area; and the shroud forms a second void for connecting testing equipment to the test cock.

2. A valve assembly as recited in claim 1, wherein the shroud forms a slit, and further comprising a retention fork in the slit so that the test cock is selectively captured in the inner area but the test cock can be removed from and inserted into the inner area without rotation when the retention fork is removed from the slit.

3. A check cover assembly for a backflow prevention (BFP) assembly configured to be fixed in a fluid network, the check cover assembly comprising:

a test cock coupled to the BFP assembly; and
a base assembly connected to the BFP assembly, the base assembly including an upstanding shroud, wherein the shroud forms an inner area configured to closely surround the test cock to support and protect the test cock by limiting travel of the test cock, wherein the test cock and upstanding shroud are configured so that the test cock can be removed and replaced without removing the upstanding shroud,
   wherein the shroud has a cup-shaped sidewall and forms an open end and only a single U-shaped gap in the sidewall for accessing the test cock to selectively open and close the test cock while installed in the inner area, and the test cock has a distal end coupling extending out of the open end of the shroud.

4. A check cover assembly as recited in claim 3, wherein the base assembly has a base that is dome-shaped.

5. A check cover assembly as recited in claim 3, wherein the base assembly forms a passageway from the inner area into the BFP assembly configured so that when the test cock is open, a pressure reading of a pressure zone in the BFP assembly can be taken via the test cock.

6. A check cover assembly as recited in claim 3, wherein a banking surface in the inner area compliments a banking surface of the test cock to further stabilize the test cock.

7. A check cover assembly as recited in claim 3 further comprising a retention fork in a slit formed in the shroud so that the test cock is captured in the inner area but the test cock can be removed from and inserted into the inner area without rotation when the retention fork is removed from the slit.

8. A check cover assembly as recited in claim 7, wherein:
   the retention fork has two flat tines with a gap therebetween, the gap and the tines being sized to snugly fit into a groove of the test cock and the slit; and
   the base assembly forms a hollow to create a socket portion of a ball-and-socket joint formed between the check cover assembly and a check valve assembly in the BFP assembly.

9. A check cover assembly as recited in claim 3, wherein the base assembly forms a passageway from the inner area that aligns with a lumen formed in a check valve assembly in the BFP assembly, the lumen being in fluid communication with a pressure zone within the BFP assembly so that when the test cock is open, a pressure reading of the pressure zone can be taken via the test cock.

10. A check cover assembly as recited in claim 3, wherein the check cover assembly further comprises a second base assembly with a second upstanding shroud on the second base assembly, wherein the second shroud forms an inner area configured to receive a second test cock to support and protect the second test cock while allowing opening of the second test cock in place to allow pressure testing of a second pressure zone within the BFP assembly.

11. A check cover assembly as recited in claim 3, wherein the base assembly and the shroud are unitarily formed from a composite polymer.

12. A check cover assembly as recited in claim 3, wherein the base assembly is configured to allow the test cock to be replaced with a different component and the different component is selected from the group consisting of: a pressure sensor; a pressure switch; a temperature sensor; a flow sensor; and combinations thereof.

13. A check cover assembly as recited in claim 3, wherein the test cock includes a central body and a distal end coupling extending from the central body in a direction away from the BFP assembly.

14. A check cover assembly as recited in claim 13, wherein the shroud wraps around the central body.

15. A check cover assembly as recited in claim 13, wherein the shroud at least partially wraps around the central body and the distal end coupling extends out of an open end of the shroud.

16. A check cover assembly as recited in claim 15, wherein the central body further includes a proximal end coupling for connecting to a base of the base assembly.

17. A backflow prevention (BFP) assembly comprising:
a body defining an inlet and an outlet, the inlet and the outlet configured to connect to a fluid network, wherein the body defines a plurality of zones;
a test cock in fluid communication with a first zone of the plurality of zones, the test cock having: a housing; a first coupling end connected to the housing and configured to releasably mount without rotation; a second coupling end connected to the housing and configured to releasably connect to a test fixture, wherein the first and second coupling ends extend along an axis; and an actuation feature connected to the housing and for opening and closing the test cock, the actuation feature extending perpendicular to the axis; and
a check cover including: a base connected to the body; and an upstanding shroud connected to the base, wherein the shroud forms an inner area configured to receive the test cock to support the housing of the test cock and protect the test cock, wherein the shroud forms a gap for accessing the actuation feature of the test cock to selectively open the test cock while installed in the inner area for pressure testing the first zone in the BFP assembly, wherein during mounting of the test cock, the actuation feature slides linearly within the gap, and after mounting, the second coupling end extends out of the inner area for connecting to the test fixture.

18. A BFP assembly as recited in claim 17, further comprising: a second base connected to the body; and a second upstanding shroud on the second base, wherein the second upstanding shroud forms an inner area configured to receive a second test cock to support and protect the second test cock while allowing selectively opening of the second test cock in place to allow pressure testing of a second zone in the BFP assembly, wherein each test cock is a ball valve.

* * * * *